US007962236B2

(12) United States Patent
Joynt et al.

(10) Patent No.: US 7,962,236 B2
(45) Date of Patent: Jun. 14, 2011

(54) METHOD AND APPARATUS FOR DOWNLOADING DATA FROM A MACHINE

(75) Inventors: Paul J. Joynt, Ankeny, IA (US); Mike S. Simpson, Norwalk, IA (US); Daniel W. Pfeffer, West Des Moines, IA (US); Vincent L. Basile, II, West Des Moines, IA (US); Doug N. McCloskey, Runnells, IA (US)

(73) Assignee: Stork Townsend Inc., Des Moines, IA (US)

( * ) Notice: Subject to any disclaimer, the term of this patent is extended or adjusted under 35 U.S.C. 154(b) by 1138 days.

(21) Appl. No.: 10/577,363

(22) PCT Filed: Oct. 26, 2004

(86) PCT No.: PCT/US2004/035481

§ 371 (c)(1), (2), (4) Date: Mar. 2, 2007

(87) PCT Pub. No.: WO2005/045542

PCT Pub. Date: May 19, 2005

(65) Prior Publication Data

US 2007/0185605 A1 Aug. 9, 2007

Related U.S. Application Data

(60) Provisional application No. 60/515,170, filed on Oct. 28, 2003.

(51) Int. Cl.
*G06F 19/00* (2011.01)

(52) U.S. Cl. .......... 700/116; 235/385; 356/445; 702/27

(58) Field of Classification Search .................... 700/83, 700/116; 702/27; 235/385; 356/445
See application file for complete search history.

(56) References Cited

U.S. PATENT DOCUMENTS

| | | | | |
|---|---|---|---|---|
| 4,885,707 | A | 12/1989 | Nichol et al. | |
| 5,758,300 | A | 5/1998 | Abe | |
| 5,918,190 | A * | 6/1999 | Nadeau | 702/27 |
| 6,245,369 | B1 | 6/2001 | Kobussen et al. | |
| 6,363,328 | B1 * | 3/2002 | Nadeau | 702/27 |
| 6,554,188 | B1 * | 4/2003 | Johnson et al. | 235/385 |
| 2002/0152901 | A1 | 10/2002 | Basile et al. | |
| 2003/0115019 | A1 | 6/2003 | Doddek et al. | |
| 2003/0195640 | A1 | 10/2003 | Krocker et al. | |

FOREIGN PATENT DOCUMENTS

| | | | |
|---|---|---|---|
| DE | 19522937 | A1 | 4/1996 |
| JP | 2003186531 | | 7/2003 |
| WO | 0216210 | A1 | 2/2002 |

* cited by examiner

*Primary Examiner* — Albert Decady
*Assistant Examiner* — Douglas S Lee

(57) ABSTRACT

A device for downloading data from a machine having a touch screen or PLC to govern its operation, the device includes a handheld control unit that is operably associated with the touch screen or PLC such that the touch screen or PLC can be downloaded from the touch screen onto the device and information from the device can be transmitted to a personal computer to be viewed or printed. Additionally, a method of downloading the data from a machine having a touch screen or PLC to a handheld control unit and downloading this information to a personal computer such that the information can be viewed or printed.

6 Claims, 2 Drawing Sheets

METHOD AND APPARATUS FOR DOWNLOADING DATA FROM A MACHINE

CROSS REFERENCE TO RELATED APPLICATION

This application claims the benefit of U.S. Provisional Application No. 60/515,170 filed Oct. 28, 2003.

BACKGROUND OF THE INVENTION

This invention relates to a data information retrieval system. More specifically, this invention relates to a method and apparatus for downloading data from a meat processing machine to a handheld or remote device and then sending that information to a controller such as a personal computer (PC) to generate reports.

When generating machine reports for a meat processing machine in a facility one must sit at the monitor or touch screen of a machine and read information regarding that machine. This information must be written down and then physically taken to a computer where the information is inputted and interpreted. This manual recording and calculation process allows for human error in the taking of information and also causes a need for an individual to continually monitor and take information to a computer to input the data. Consequently, there is a need in the art to provide for a device that will allow for information to be automatically transferred to the device from a machine so that the device may be used as an intermediary to transmit the machine information to other sources such as a computer.

Specifically the technical problem that is solved by the present invention is that currently meat processing machines process information about meat and the machine and that data must be taken down by hand by an individual. This process can be very tedious, time consuming and can present many opportunities for inaccuracies. Thus, a system that improves upon taking hand calculations from a machine that monitors a meat processing machine is desired.

The background art of this invention includes German Patent No. DE19522937. This disclosure teaches a device that receives information from an automobile communication device and that communicates with a computer. This device does not properly achieve the goals of the present invention because this disclosure does not teach a system for monitoring a meat processing device. Nor does this disclosure teach what type of parameters would be sensed by a meat sensing device to provide information to an intermediary device or a computer.

Another reference is U.S. Patent Publication No. 2003/0195640 to Krocker. This reference teaches a system for servicing a computer controlled machine. This machine sends a signal to a service tool that relays information to a computer or a second service tool that can relay the information to other areas. Again, Krocker does not teach using such a device on a meat processing machine. Nor does it teach sensing parameters that are associated with a meat processing machine.

U.S. Publication No. 2003/0115019 to Doddek teaches a system and method for analyzing and providing exception based reports for machine data. Again the Doddek reference does not teach or contemplate retrieving information regarding a meat processing machine nor does it teach how to sense parameters of a meat processing machine.

For this Device, the Following Specifications Should be Present:

1. Ability to be able to transfer files to a controller such as a PC.

2. Ability to be able to print this information out from the controller.

3. Ability to retrieve data from numerous machines in one plant.

4. The handheld unit or remote device could be proprietary to the specific machines.

5. Additional information from a display such as a touch screen may need to be transferred such as time, pressure settings, initials of the person gathering the data, name of product being run, recipe, etc.

Therefore, it is a primary object of the present invention to provide a method for downloading data from a machine to an intermediary device such that the device is able to transfer machine files to a controller.

Yet another object of the present invention is to provide a system wherein information taken from a machine by an intermediary device is able to be sent to a controller that prints out this information.

Another object of the present invention is to provide a device that can retrieve data from numerous machines in one plant.

Yet another object of the present invention is to provide an intermediary handheld unit that is proprietary to the specific machine that the information is being taken.

Yet a further object of the present invention is to provide an intermediate handheld device that is able to retrieve information from a display such as time, pressure settings, initials of person gathering the data, the name of the product being run, the recipe, and other such information.

These and other objects, features, or advantages of the present invention will become apparent from the specification and claims.

BRIEF SUMMARY OF THE INVENTION

This invention involves a method and means for downloading data from a machine, for example, in order to extract operational data from the machine by wireless or hard wire means.

The features of this invention are:

1. A system that would allow information to be downloaded or transferred from a machine into an intermediary device such as a handheld device.

2. Information on the intermediary device that can be downloaded to a controller.

3. Information that can be viewed or printed as documents or reports. (The information could consist of the information shown on the "management information screen" of the touch screen.)

4. Options of methods to transfer information from the machine to the handheld device include, but are not limited to:

Infrared Frequency transfer (IR)

Radio Frequency transfer (RF)

Cable connection transfer

DESCRIPTION OF THE PREFERRED EMBODIMENTS OF THE INVENTION

Figure 1:
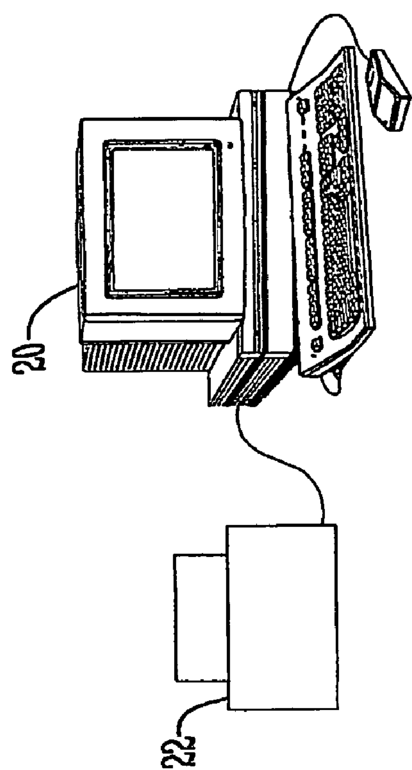
FIG. 1 is a perspective view of the device of the present invention.
Figure 1:
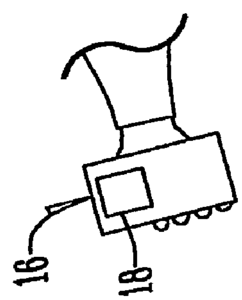
Figure 1:
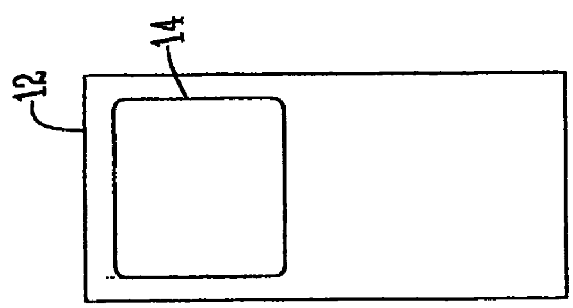
Figure 2:
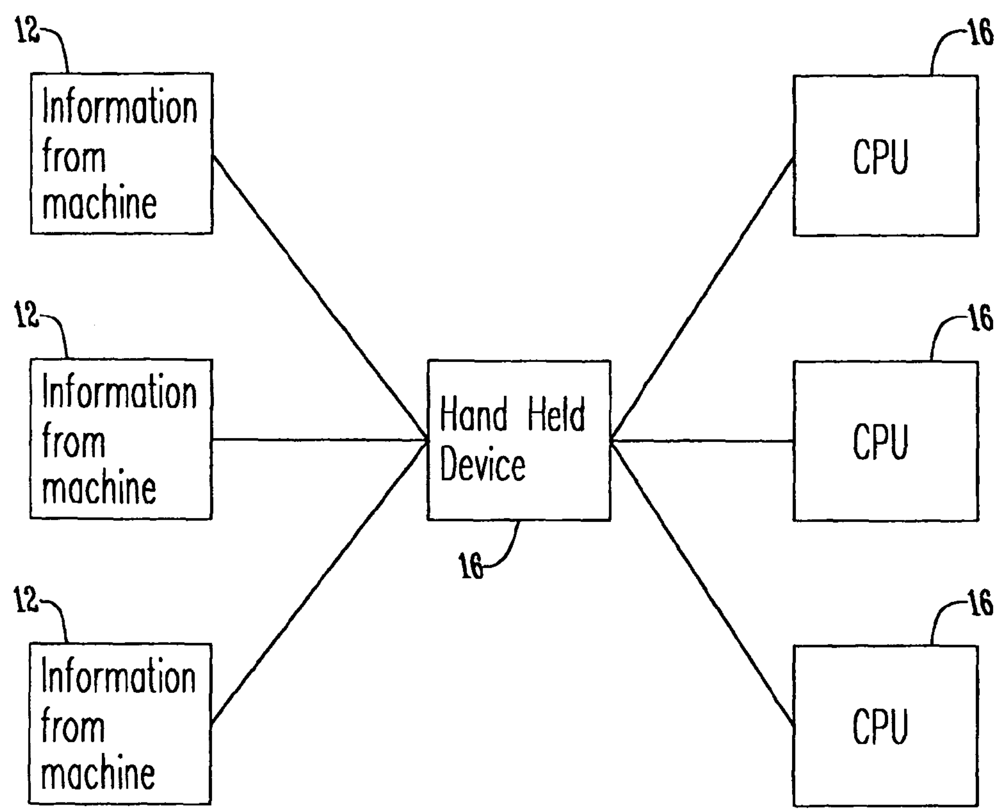
FIG. 2 is a schematic view of the device of the present invention.

As best seen in FIG. 1 the present invention involves a system of information retrieval 10. The system has at least one machine 12 having a display such as a touch screen or PLC 14 that governs its information. Additionally within the system is an intermediary device such as a handheld control unit 16 that is operatively associated with the touch screen or PLC such that it can be selectively actuated to download data from the touch screen or PLC. The handheld control 16 can have its own screen 18 such that an operator can view the information from the machine 12 that is to be transmitted. The handheld control unit 16 transmits information taken from the machine 12 to at least one controller such as a personal computer (PC) 20 that can have a printer 22 operably connected thereto to print out the information retrieved.

In operation, the method for downloading data from the machine 12 involves taking the handheld control unit 16 that is operably associated with the touch screen or PLC 14 that can be selectively actuated to download data from the touch screen or PLC 14 to a PC 20 such to transmit this information to the PC to be viewed and/or printed. Thus, information is transmitted from the touch screen or PLC 14 to the handheld control unit 16 and then transmitted from the handheld control unit 16 to the PC.

Optionally, the machine 12 is a meat processing machine that processes information on its touch screen 14 such as the amount of time that the device runs, the pressure settings of the device, initials of the person gathering the data, the name of the product being run, the recipe being used to make the product, or any other information regarding the meat product being processed. One skilled in the art will understand that the handheld control 16 can be hardwired to the PC 20 or could be connected to the PC via a wireless system. Similarly, the handheld control 16 can be hardwired to the touch screen or PLC 14.

Optionally, the handheld device 16 can be a PALM unit that is associated with the PC 20 and either hardwired to an auxiliary port or an IR data port, and downloaded to a standard format, Excel, Word, Lotus, or WordPad. This information is not able to be manipulated but just viewed and printed out.

One skilled in the art will also appreciate that once the data is downloaded in the PC 20 from the handheld device 16 that the information can be viewed or printed as documents or reports. Optionally, this information could be entitled "Management Information Screen" on the screen 18 of the handheld device 16.

Additionally, one skilled in the art will appreciate there are many methods that may be used to transfer information from the machine touch screen 14 to the handheld device 16. The methods include, but are not limited to an infrared transfer, a radio frequency transfer, or a cable connection transfer.

Furthermore, one skilled in the art will understand that the handheld unit 16 can be proprietary to a specific machine 12, and will be able to receive data from numerous machines within one plant. For instance, six machines could transmit information at one time to the handheld device 16. Finally, one skilled in the art will understand that the handheld device 16 can transmit information to a plurality of different computers 20. Thus, all of the stated objectives have been met.

What is claimed is:

1. A method of downloading data from a meat processing machine characterized in providing a meat processing machine that has a touch screen that governs information of the meat processing machine;

providing a hand held control that has a screen and that is operatively associated with the touch screen of the meat processing machine;

selectively actuating the hand held control to transfer information regarding a meat product being processed from the meat processing machine to the hand held control wherein an operator views the information from the meat processing machine that has been transmitted to the hand held control on the screen of the hand held control; and formulating the transferred information to be viewed; and providing a personal computer to receive the transferred information from the meat processing machine via the hand held control.

2. The method of claim 1 wherein the transferred data is selected from the group consisting of running time, pressure settings, initials of person gather data, name of product being run, recipe being used to make the product, and meat processing information.

3. The method of claim 1 further comprising the step of transmitting the transferred data to a controller.

4. A system for downloading data from a machine characterized in:

a meat processing machine that has a touch screen that governs information of the meat processing machine;

a hand held control that has a screen and that is operatively associated with the touch screen of the meat processing machine such that information regarding a meat product being processed is transferred from the meat processing machine to the hand held control by selectively actuating the hand held control;

the hand held control being operable to formulate the transferred information to be viewed on the screen of the hand held control; and a personal computer to receive information regarding the meat product being processed transmitted from the meat processing machine via the hand held control.

5. The system of claim 4 wherein the transferred data is selected from the group consisting of running time, pressure settings, initials of person gather data, name of product being run, recipe being used to make the product, and meat processing information.

6. The system of claim 4 further comprising a controller operatively associated with the intermediary device.

* * * * *